(12) United States Patent
Radke et al.

(10) Patent No.: US 7,431,073 B2
(45) Date of Patent: Oct. 7, 2008

(54) COOLING SYSTEM WITH ACTIVE DEBRIS SEPARATION

(75) Inventors: Daniel Dean Radke, Dubuque, IA (US); Nicholas Edward Bollweg, Dubuque, IA (US); Bradley A. Flaminio, Des Plaines, IL (US); Anne Louise Yoder, Urbandale, IA (US); Timothy James Rathsam, Vernon Hills, IL (US); Kimberly Marie Woehrle, Donahue, IA (US)

(73) Assignee: Deere & Company, Moline, IL (US)

( * ) Notice: Subject to any disclaimer, the term of this patent is extended or adjusted under 35 U.S.C. 154(b) by 499 days.

(21) Appl. No.: 11/005,138

(22) Filed: Dec. 6, 2004

(65) Prior Publication Data

US 2006/0118281 A1    Jun. 8, 2006

(51) Int. Cl.
*F28F 19/01* (2006.01)
(52) U.S. Cl. ........................ 165/119; 165/122; 55/385.3
(58) Field of Classification Search ................. 165/119, 165/112; 55/385.3
See application file for complete search history.

(56) References Cited

U.S. PATENT DOCUMENTS

| | | | | |
|---|---|---|---|---|
| 2,796,141 A | * | 6/1957 | Schreiner | 165/119 |
| 3,827,483 A | * | 8/1974 | Hopkinson | 165/122 |
| 4,034,804 A | * | 7/1977 | Meijer et al. | 165/119 |
| 4,053,293 A | * | 10/1977 | Combs | 55/315.1 |
| 4,250,897 A | | 2/1981 | Glaser | |
| 4,417,636 A | * | 11/1983 | Mazur | 165/122 |
| 4,832,116 A | * | 5/1989 | Easton | 165/119 |
| 4,934,449 A | * | 6/1990 | Watt et al. | 165/119 |
| 5,168,424 A | * | 12/1992 | Bolton et al. | 165/122 |

FOREIGN PATENT DOCUMENTS

JP    07293247 A  * 11/1995

* cited by examiner

*Primary Examiner*—Leonard R Leo

(57) ABSTRACT

A powered precleaner separates debris from atmospheric air through the use of a blower and a separation chamber. The chamber includes people are inlet orifice and at least two exit orifices, including an outlet orifice and an exit orifice containing at least one heat exchanger. The blower blows air and debris along an inner surface of the separation chamber and out of the outlet orifice. The outlet orifice is sized to allow large debris to exit the chamber. Sufficient backpressure is created to cause a predetermined amount of precleaned air to flow through the exit orifice containing the heat exchanger. A screen may be added to trap larger light debris and prevent it from flowing to and plugging the heat exchanger.

28 Claims, 3 Drawing Sheets

COOLING SYSTEM WITH ACTIVE DEBRIS SEPARATION

FIELD OF THE INVENTION

The invention relates to cooling systems with pre-cleaners. In particular, it relates to cooling systems operating in environments with relatively high debris content where pre-cleaning of the air is virtually required.

BACKGROUND OF THE INVENTION

Engine cooling theory for cars, heavy trucks and off-highway equipment is very similar. The components used to accomplish cooling goals are similar and include, for example, radiators, condensers, oil coolers, charge air coolers, etc. However, the component technologies for cars and heavy trucks differ considerably from those of off-highway equipment.

Automotive cores tend to be compact with dense fin counts and the fins tend to have gill-like louvers. Such technology is appropriate for automobiles as these machines typically operate in atmospheres of relatively little debris in which cores with dense fin counts have little risk of plugging. However, such technology is usually inappropriate for off-highway equipment, regardless of OEM, as fine cores of this type will very quickly plug with dirt, debris, chaff, pine needles, etc. Thus, off-highway equipment tends to use cores with simple, non-louvered fins and very low fin counts having a relatively large amount of space between fins. Such an arrangement reduces the risk of plugging but leads to a need for a large area to package the larger cores required for sufficient heat transfer. Additionally, in many applications, even with cores having very low fin counts, operators need to regularly clean or blowout the heat exchanger's in order to prevent overheating.

SUMMARY OF THE INVENTION

As earlier stated, even heat exchanger cores with very low fin counts often require regular cleaning in order to prevent plugging and overheating. This leads to lower efficiency with respect to heat transfer and higher maintenance costs. Described and claimed herein is an invention that will substantially improve the atmosphere to which off-road heat exchanger cores are exposed.

The invention accomplishes the noted improvement by actively separating debris from atmospheric air prior to its flowing through the heat exchanger core. Essentially, a concentrated flow of air is blown into a first end of a chamber and exits the chamber through at least two orifices, i.e., a first exit orifice and a second exit orifice. The first exit orifice is at a second end of the chamber and, generally, parallel to the original line of flow, while the second exit orifice is generally orthogonal to the line of flow and generally contains at least one heat exchanger. As the air flows through the chamber, the mass of the debris tends to carry it along and cause it to exit the second end of the chamber. Additionally, the dimensions of the first exit orifice are small enough to cause sufficient backpressure for some of the air to flow through the heat exchanger at the second exit point. Naturally, the air flowing through the heat exchanger is pre-cleaned and substantially lower in debris content than the atmospheric air entering the first end of the chamber as the mass of the heavier debris has caused it to exit the chamber at the first exit orifice. A screen may be added to the chamber between the area of entry of the concentrated flow of air in the top of the first exit orifice to prevent light debris from floating to the heat exchanger.

BRIEF DESCRIPTION OF THE DRAWINGS

Embodiments of the invention will be described in detail, with references to the following figures, wherein.

DESCRIPTION OF THE PREFERRED EMBODIMENT

Figure 1:
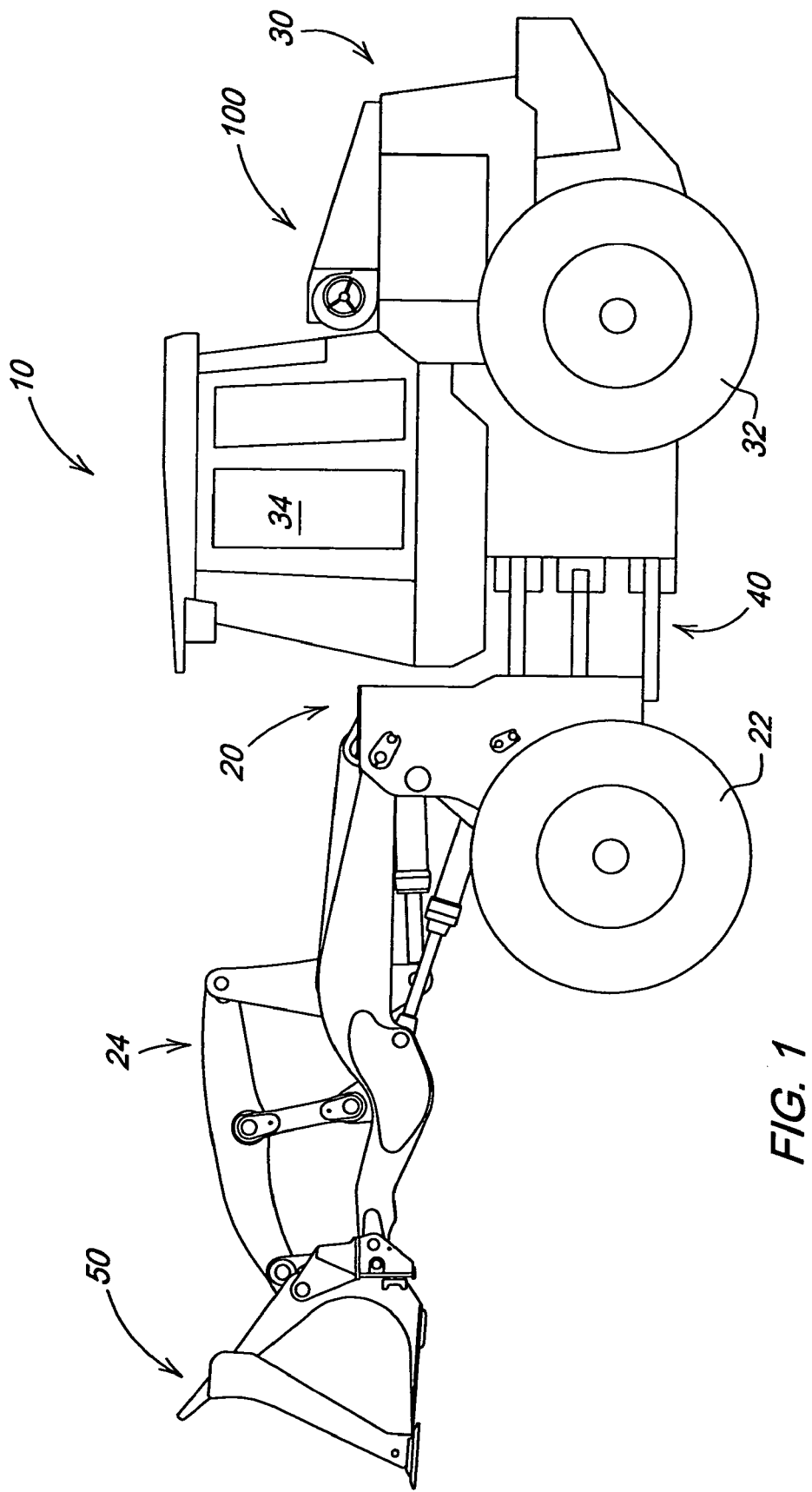
FIG. 1 is a side view of an exemplary embodiment of vehicle equipped with the invention.

FIG. 1 illustrates a work vehicle in which the invention may be used. The particular work vehicle illustrated in FIG. 1 is an articulated four-wheel-drive motor 1 having a mainframe or body 10 that includes a front frame 20 pivotally connected to a rear frame 30 by vertical pivots 40, the loader being steered by pivoting of the front frame 20 relative to the rear frame 30 by means well known in the art. The front and rear frames 20 and 30 are respectively supported on front drive wheels 22 and rear drive wheels 32. An operator's station is provided on the rear frame 30 and is generally located above the vertical pivots 40. The front and rear drive wheels 22 and 32 propel the vehicle along the ground and are powered in a manner well known in the art.

Mounted on the front frame 20 is a linkage 24. Operatively attached to the linkage 24 is a work tool or bucket 50.

Figure 2:
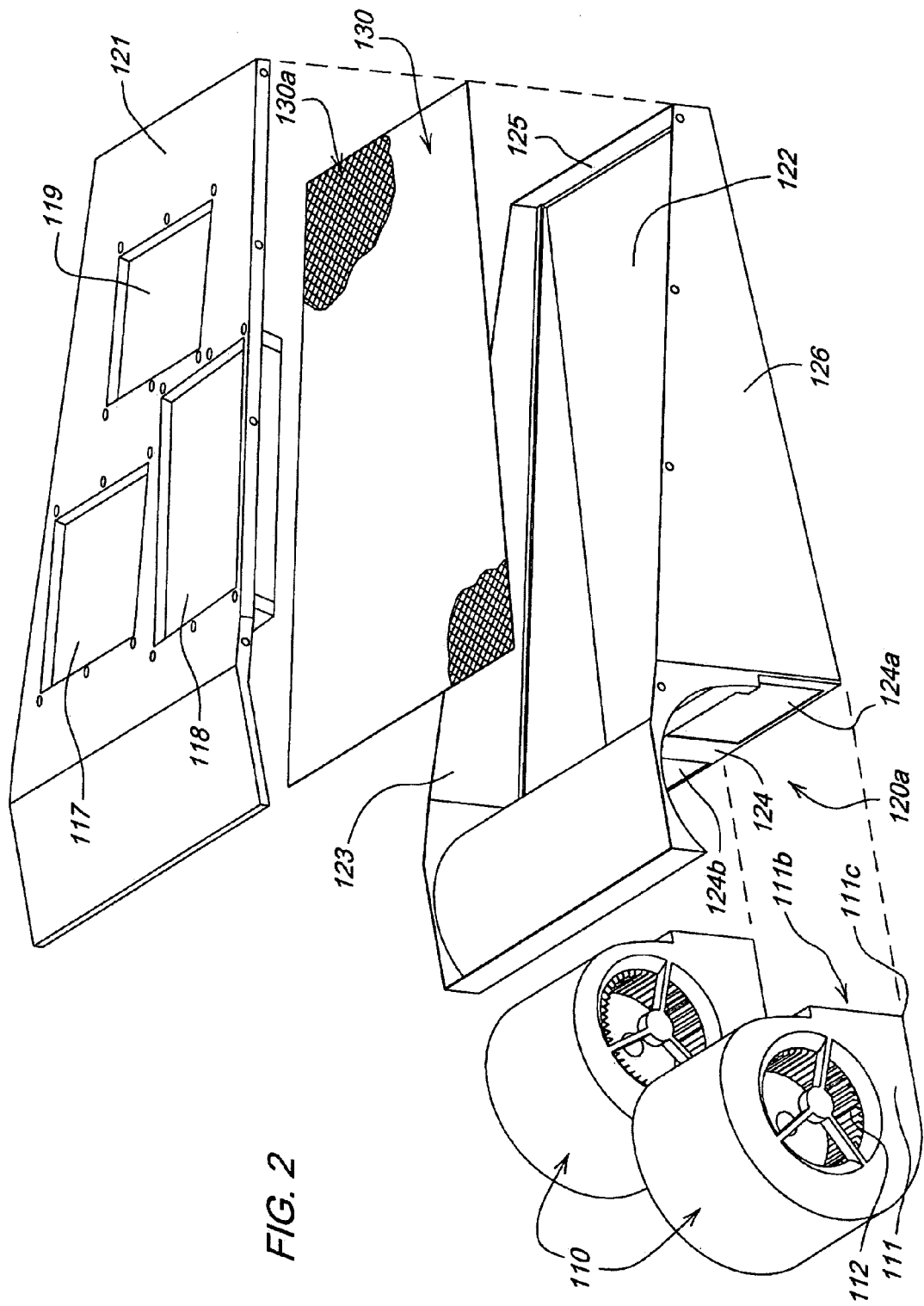
FIG. 2 is an illustration of an exemplary embodiment of the invention.
Figure 3:
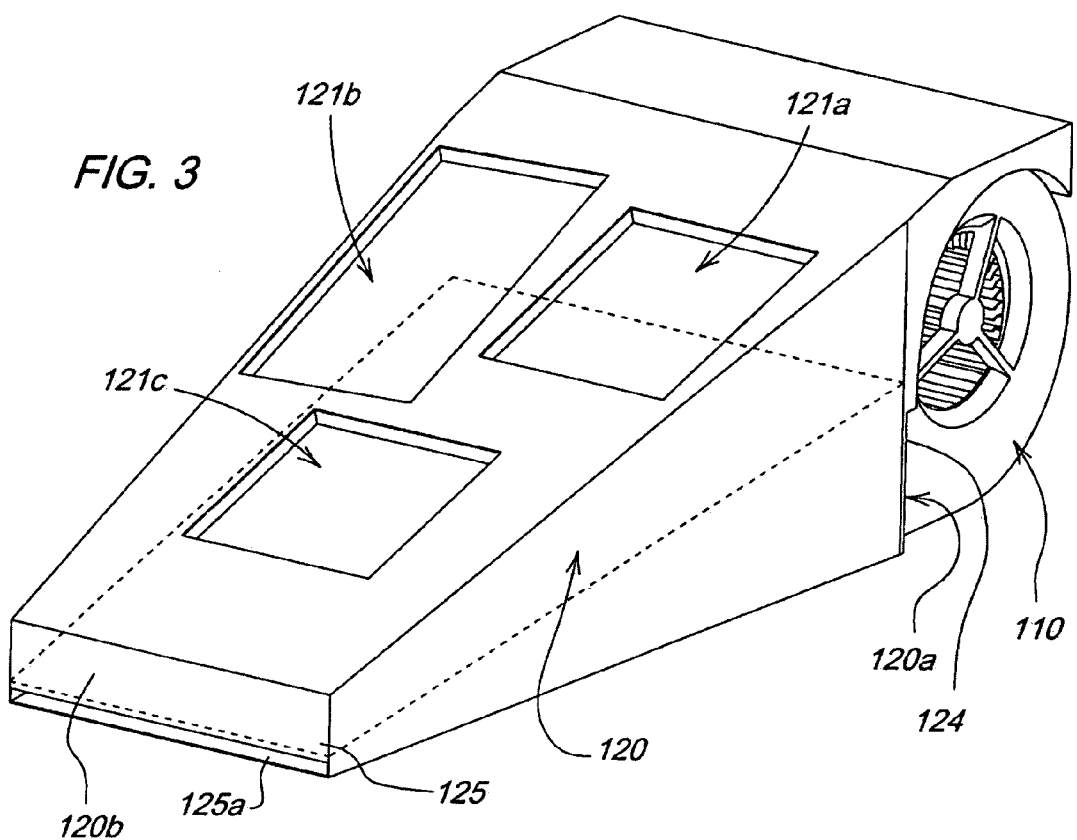
FIG. 3 is an oblique view of the embodiment illustrated in FIG. 2.

Forming a part of the rear portion 30 of the loader 1 is a cooling system 100. As illustrated in FIG. 2, this particular embodiment of the cooling system 100 includes: two blowers 110; three heat exchangers 117, 118, 119; and a separation chamber 120. Each of the blowers 110 includes a blower cage 111 and a blower fan 112. The blowers 110 illustrated are tangential, but may be of the centrifugal type, or any other type that blows air in a concentrated arrangement and drives heavier debris toward an outer edge 113a of each blower cage exit orifice or outlet 113.

The separation chamber 120 has a first end 120a and a second end 120b. The first end 120a includes a first end wall 124 with two orifices 124a, 124b interfacing with, i.e., attached to blower outlets 113 in a manner well known in the art. The second end 120b includes a second end wall 125 with an exit orifice 125a. This particular embodiment of the separation chamber 120 also includes four additional walls: a first sidewall 121; a second sidewall 122; a third sidewall 123; and a fourth sidewall 126. The first sidewall 121 includes orifices 121a, 121b, 121c interfacing respectively with the heat exchangers 117, 118, 119. The heat exchangers 117, 118, 119 are respectively attached to the orifices 121a, 121b, 121c in a manner well known in the art. A screen 130 having a mesh 130a spans the internal length and width of the chamber 120 starting at an area above the two orifices 124a, 124b and ending at the exit orifice 125a. The screen 130 is removably attached to the separation chamber 130 by screws and bolts (not shown), i.e., means well known in the art.

In operation, air and debris enter the inlets 111a and is blown in a concentrated flow along the sidewall 123 by the blowers 110. The centrifugal nature of the blowers 110 forces the heavier debris in the air toward an outer edge 113a of each of the blower outlets 113 and the concentrated flow of air tends to move the heavier debris along the second sidewall 122 toward the exit orifice 125a. Some of the lighter debris may tend to rise up and move in the direction of the heat exchangers 117, 118, 119. The larger pieces of this lighter debris are trapped by the screen 130. The exit orifice 125a in end wall 125 allows the debris in the air to exit the chamber 120 but is sized to create backpressure sufficient to force cleaner air through the heat exchangers 117, 118, 119. Thus, debris exits the chamber 120 via the exit orifice 125a and pre-cleaned air exits the chamber 120 via the heat exchangers 117, 118, 119. Light debris trapped by the screen 130 is either blown through the exit orifice 125a immediately or falls to the bottom of the separation chamber 120 when the blowers 110 are turned off and subsequently blown through the exit orifice 125a when the blowers 110 are once again turned on. The screen mesh 130a is predetermined and sized to allow only particles of debris that are small enough to flow through the heat exchangers 117, 118, 119 with the greatest fin density. Thus, any debris that is likely to plug the heat exchangers 117, 118, 119 is trapped by the screen 130.

Figure 4:
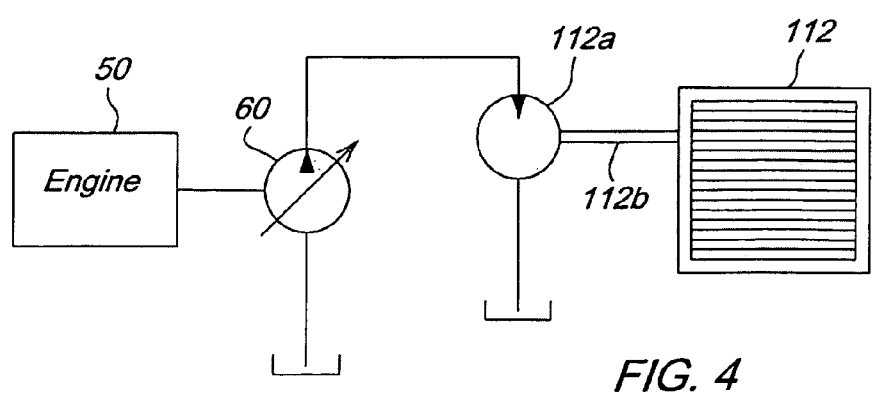
FIG. 4 illustrates an exemplary embodiment of a fluid supply to the fan motor.

The fan 112 is powered by a hydraulic motor 112a has illustrated in FIG. 4. The to hydraulic motor 112a is powered by a variable displacement pump 60 which is, in 10, powered by an engine 50.

Having described the preferred embodiment, it will become apparent that various modifications can be made without departing from the scope of the invention as defined in the accompanying claims.

The invention claimed is:

1. A cooling system for a work vehicle, comprising:
   a blower having an inlet and an outlet;
   at least one heat exchanger; and
   a separation chamber, the separation chamber having at least a screen with a predetermined mesh, a first sidewall, a second sidewall, a third sidewall, a fourth sidewall, a first end, a second end, a first end wall and a second end wall, the first end having a first cross-sectional area, the second end having a second cross-sectional area, the second end wall having a chamber outlet orifice, the first sidewall having an orifice containing the at least one heat exchanger, the at least one heat exchanger arranged such that air may flow through the at least one heat exchanger from an area inside the separation chamber to an area outside the separation chamber, the second sidewall being in proximity to the outlet and arranged such that air leaving the outlet flows substantially tangential to the surface of the second sidewall, the blower blowing air from the first end to the second end, the chamber outlet orifice large enough to allow a passage of debris, the blower hurling debris away from a center of the blower and along the second sidewall toward the chamber outlet orifice, the chamber outlet orifice being small enough to produce a backpressure of sufficient level to cause a predetermined amount of air to flow through the at least one heat exchanger from the area inside the separation chamber, the screen spanning a length and width of the separation chamber, the screen located between the first sidewall and the second sidewall, the screen being above the outlet and above the chamber outlet.

2. The cooling system of claim 1, wherein the distance between the first sidewall and the second sidewall is greater at the first end than at the second end.

3. The cooling system of claim 1, wherein the first cross-sectional area is greater than the second cross-sectional area.

4. The cooling system of claim 1, wherein the separation chamber contains the blower.

5. The cooling system of claim 4, wherein the fourth sidewall comprises at least a first inlet and a second inlet, including at least a first orifice for the first inlet and a second orifice for the second inlet.

6. The cooling system of claim 5, wherein air flow in into the at least the first inlet and the second inlet is substantially limited to air flowing through the at least the first orifice and the second orifice respectively.

7. The cooling system of claim 4, wherein fourth sidewall includes an orifice for an inlet.

8. The cooling system of claim 7, wherein air flow into the inlet is substantially limited to air flowing through the sidewall orifice.

9. The cooling system of claim 1, wherein the blower is located outside the separation chamber.

10. The cooling system of claim 9, wherein the first end wall contains a chamber inlet orifice sized to include the outlet, air flowing through the chamber inlet orifice being substantially limited to air flowing from the outlet.

11. The cooling system of claim 1, wherein the blower is a centrifugal fan.

12. The cooling system of claim 1, wherein the blower is a tangential fan.

13. The cooling system of claim 1, wherein the screen is located from about the top of the outlet to about the top of the chamber outlet.

14. The cooling system of claim 13, wherein the predetermined mesh is sized to trap debris large enough to plug the at least one heat exchanger.

15. A work vehicle, including a cooling system, the cooling system comprising:
   a blower having an inlet and an outlet;
   at least one heat exchanger; and
   a separation chamber, the separation chamber having at least a screen with a predetermined mesh, a first sidewall, a second side wall, a third sidewall, a fourth sidewall, a first end, a second end, a first end wall and a second end wall, the first end having a first cross-sectional area, the second end having a second cross-sectional area, the second end wall having a chamber outlet orifice, the first sidewall having an orifice containing the at least one heat exchanger, the at least one heat exchanger arranged such that air may flow through the at least one heat exchanger from an area inside the separation chamber to an area outside the separation chamber, the second sidewall being in proximity to the outlet and arranged such that air leaving the outlet flows substantially tangential to the surface of the second sidewall, the blower blowing air from the first end to the second end, the chamber outlet orifice large enough to allow a passage of debris, the blower hurling debris away from a center of the blower and along the second sidewall toward the chamber outlet orifice, the chamber outlet orifice being small enough to produce a backpressure of sufficient level to cause a predetermined amount of air to flow through the at least one heat exchanger from the area inside the separation chamber, the screen spanning a length and width of the separation chamber, the screen located between the first sidewall and the second sidewall, the screen being above the outlet and above the chamber outlet.

16. The work vehicle of claim 15, wherein the distance between the first sidewall and the second sidewall is greater at the first end than at the second end.

17. The work vehicle of claim 15, wherein the first cross-sectional area is greater than the second cross-sectional area.

18. The work vehicle of claim 15, wherein the separation chamber contains the blower.

19. The work vehicle of claim 18, wherein the fourth sidewall comprises a first inlet and a second inlet, including a first orifice for the first inlet and a second orifice for the second inlet.

20. The work vehicle of claim 19, wherein air flow in into the first inlet and the second inlet is substantially limited to air flowing through the first orifice and the second orifice respectively.

21. The work vehicle of claim 18, wherein the fourth sidewall includes an orifice for an inlet.

22. The work vehicle of claim 21, wherein air flow into the inlet is substantially limited to air flowing through the sidewall orifice.

23. The work vehicle of claim 15, wherein the blower is located outside the separation chamber.

24. The work vehicle of claim 23, wherein the first end wall contains a chamber inlet orifice sized to include the outlet, air flowing through the chamber inlet orifice being substantially limited to air flowing from the outlet.

25. The work vehicle of claim 15, wherein the blower is a centrifugal fan.

26. The work vehicle of claim 15, wherein the blower is a tangential fan.

27. The work vehicle of claim 15, wherein the screen is located from about the top of the outlet to about the top of the chamber outlet.

28. The work vehicle of claim 27, wherein the predetermined mesh is sized to trap debris large enough to plug the at least one heat exchanger.

* * * * *